April 22, 1930.   R. W. RICHARDS   1,755,665
MACHINE FOR PLUCKING POULTRY
Filed Feb. 7, 1929   2 Sheets-Sheet 1
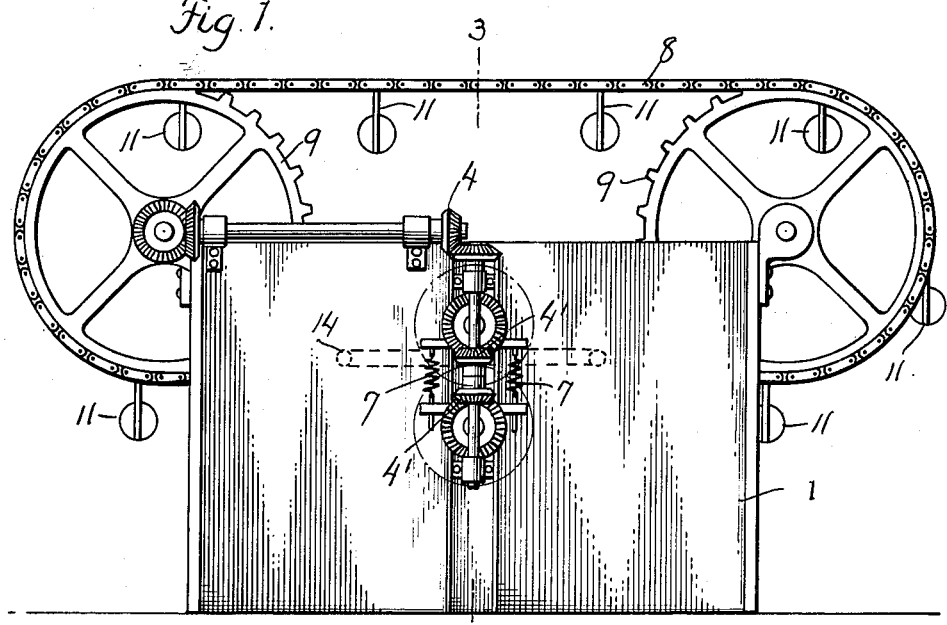
Inventor
Ralph W. Richards.
C. W. Anderson Jon.
By
Attorney April 22, 1930.　　　R. W. RICHARDS　　　1,755,665
MACHINE FOR PLUCKING POULTRY
Filed Feb. 7, 1929　　　2 Sheets-Sheet 2
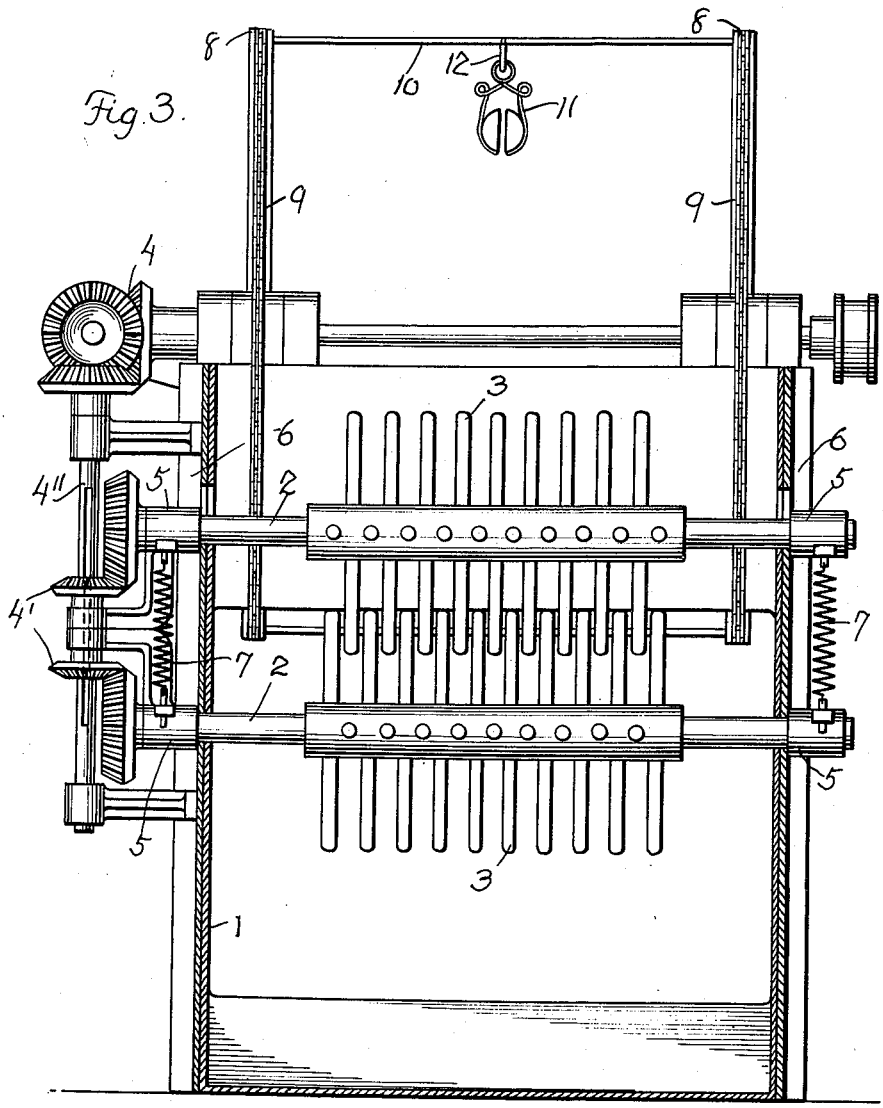
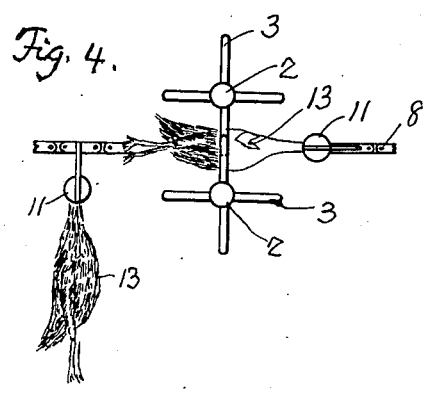
Inventor
Ralph W. Richards.
E.W. Anderson Jr.
By
Attorneys Patented Apr. 22, 1930

1,755,665

UNITED STATES PATENT OFFICE

RALPH W. RICHARDS, OF ATCHISON, KANSAS, ASSIGNOR TO ANNA JOSEPHINE RICHARDS, OF ATCHISON, KANSAS

MACHINE FOR PLUCKING POULTRY

Application filed February 7, 1929. Serial No. 338,309.

The invention has relation to a machine for performing the operation of plucking the feathers from poultry in quantity, without in any way injuring the flesh of the fowls, an object being to provide a relatively simple machine of this description which will do the work satisfactory in a short space of time per fowl, and on a large scale. Other objects and advantages will hereinafter appear.

The invention consists in the novel construction and combinations of parts as hereinafter set forth.

In the accompanying drawings illustrating the invention Figure 1 is a side view of the machine; Figure 2 is a plan view of the same; Figure 3 is a section on the line 3—3, Figure 1, and Figure 4 is a detail fragmentary diagrammatic view, showing the fowl as it approaches the plucking brushes and as it passes through the same.

In these drawings, the numeral 1 designates a box or inclosure in which are disposed two parallel horizontal spaced shafts 2, 2, each of which has radial rubber plucker fingers 3 arranged around it circumferentially in the form of a brush, these fingers being of such length and staggered arrangement that they will overlap for about half their length when closed together. Each picker or plucker finger is about five eighths of an inch in diameter and six inches long, with rounded outer end, being approximately of the dimensions of a finger of the human hand, and made of soft rubber of such elasticity as to operate as nearly as possible as would a finger of the human hand. The fingers of the two brushes overlap as stated, the space separating the overlapped fingers being slight, and a suitable number of longitudinal lines of fingers being provided for each brush as may be necessary or advisable.

The two brushes 3 are driven by gearing 4 and are yieldable to admit the fowl therebetween, said fowl approaching head first as will be explained, said yieldability admitting of the brushes working close to the heads, necks and legs as well as to the bodies of the fowls, and being provided for by having the brush shafts 2 bearing at each end in slidable boxes 5, working in grooves 6 of the framing and held together by coiled springs 7. There may be one or more sets of the brushes 3 as may be preferred.

The gearing 4 includes bevel gears 4' keyed to shaft 4'' and slidable thereon without disturbance of the gearing connection or drive in the separation of the brushes in admitting the fowls therebetween.

In order to feed the fowls to the plucking brushes an endless sprocket chain 8 passes around large sprocket wheels 9 and is arranged at each side of the machine, said chains being connected by transverse rods 11 at intervals, said rods carrying each centrally thereof a spring clamp device 11 including a swivel 12, said clamp device being adapted to engage the head of the fowl 13, the fowls hanging vertically downwards through force of gravity and as the fowls approach the rotary brushes 3, each fowl is lifted from vertical to horizontal position through engagement with the fingers of the lower brush, such lifting being resisted by the dead weight of the fowl, whereby the rapidly rotating brushes will act more effectually in removing the feathers. As the fowls leave the brushes they will fall to vertical position again.

A water pipe 14 may extend around the inside of the box 1 as shown in Figure 1 and is provided with perforations to discharge jets of water upon the brushes for cleansing purposes.

The operation of the elastic rubber fingers 3 of approximately the dimensions of the fingers of the human hand is found to be particularly effective in practice for feather plucking purposes.

I claim:—

1. In a machine for plucking feathers from poultry, a rotary shaft carrying longitudinal series of radial elastic rubber fingers to form a brush, said fingers being each of elongated form, of circular cross section, and having rounded outer ends.

2. In a machine for plucking feathers from poultry, parallel spaced shafts having each longitudinal series of radial elastic rubber fingers to form a brush, the fingers of the two brushes being staggered and engaged with each other in overlapping fashion and being each of elongated form, of circular cross section, and having rounded outer ends.

3. In a machine for plucking feathers from poultry, parallel spaced shafts having each longitudinal series of radial elastic rubber fingers to form a brush, said fingers being each of elongated form, of circular cross section and having rounded outer ends, the fingers of the two brushes being staggered and engaged with each other in overlapping fashion, and means for yieldably mounting said brushes to admit of separation thereof in the passage of the fowls therebetween.

4. In a machine for plucking feathers from poultry, parallel spaced shafts having each longitudinal series of radial elastic rubber fingers to form a brush, said fingers being each of elongated form, of circular cross section and having rounded outer ends, means for yieldably mounting said brushes to admit of the separation thereof in passage of the fowls therebetween, and means for rotating said brushes including a shaft, and bevel gears keyed and slidable thereon in the separation of the brushes without disturbance of the drive of said rotating means.

5. In a machine for plucking the feathers from poultry, a rotary shaft carrying longitudinal series of radial elastic rubber fingers to form a brush, said fingers being each of elongated form, of circular cross section and having rounded outer ends, and means for feeding the fowls to said brush including parallel spaced sprocket gearing and chains, transverse rods connecting said chains and clamp devices spaced apart and having a swivel connection with said rod.

6. In a machine for plucking the feathers from poultry, parallel spaced shafts carrying longitudinal series of radial elastic rubber fingers to form brushes, said fingers being each of elongated form of circular cross section and having rounded outer ends, and means for feeding the fowls to said brushes including parallel spaced sprocket gearing and chains, transverse rods connecting said chains at intervals and clamp devices having each a swivel connected with one of said rods and spaced apart, the lower bight of said chains being in line with the center of the space between said brushes whereby the fowls as they approach said brushes are raised from vertical to horizontal position by engagement with the lower brush, and means for rapidly rotating said brushes and for moving comparatively slowly the said feeding means whereby the dead weight of the fowls resting upon said rapidly rotating lower brush facilitates the plucking of the feathers.

In testimony whereof I affix my signature.

RALPH W. RICHARDS.